(12) United States Patent
Monaci et al.

(10) Patent No.: US 10,209,124 B2
(45) Date of Patent: Feb. 19, 2019

(54) PASSIVE INFRARED SENSOR SYSTEM FOR POSITION DETECTION

(71) Applicant: PHILIPS LIGHTING HOLDING B.V., Eindhoven (NL)

(72) Inventors: Gianluca Monaci, Eindhoven (NL); Ashish Vijay Pandharipande, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 192 days.

(21) Appl. No.: 14/381,380

(22) PCT Filed: Jan. 28, 2013

(86) PCT No.: PCT/IB2013/050716
§ 371 (c)(1),
(2) Date: Aug. 27, 2014

(87) PCT Pub. No.: WO2013/128307
PCT Pub. Date: Sep. 6, 2013

(65) Prior Publication Data
US 2015/0102226 A1      Apr. 16, 2015

Related U.S. Application Data

(60) Provisional application No. 61/604,576, filed on Feb. 29, 2012.

(51) Int. Cl.
G01J 1/02      (2006.01)
G01J 1/04      (2006.01)
(Continued)

(52) U.S. Cl.
CPC .......... *G01J 1/0266* (2013.01); *G01J 1/0411* (2013.01); *G01J 1/4228* (2013.01); *G01J 5/0025* (2013.01);
(Continued)

(58) Field of Classification Search
CPC ............................... G08B 13/19; G01J 5/0025
(Continued)

(56) References Cited

U.S. PATENT DOCUMENTS 4,963,749 A    10/1990 McMaster
5,296,707 A    3/1994 Nozu
(Continued)

FOREIGN PATENT DOCUMENTS

JP        20061129 A     4/2006
WO      2011098931 A1   8/2011

OTHER PUBLICATIONS

T. Teixeira, et al., "Lightweight People Counting and Localizing in Indoor Spaces Using Camera Sensor Nodes", Electrical Engineering Department, Yale University, New Haven, CT, 06520, IEEE, 2007, pp. 36-43.
(Continued)

*Primary Examiner* — David P Porta
*Assistant Examiner* — Carolyn Igyarto

(57) ABSTRACT

According to the invention, a PIR sensor system (100) comprises a first PIR sensor (1) associated with a first sensing region (11) and a second PIR sensor (2) associated with a second sensing region (12). The first and second sensing regions partially overlap and are divided into detection cells (46a-46f) and (45a-45d). Each detection cell is represented by predetermined characteristics of first and second output signals, which signals are based on input signals from first and second sensing elements (4-7) of each PIR sensor. Thereby different detection cells are encoded by a certain combination of signal characteristics (amplitude and sign) of the first and second output signals. Further, the PIR sensor system comprises a processing unit (15) configured to associate the characteristics of the first and second output signals with one of the detection cells for determining (Continued)

in which of the detection cells a heat source is positioned. The invention is advantageous in that production costs of the PIR sensor system are reduced. A calibration method for identifying the correspondence between the detection cells and the output signals at installation is also provided.

16 Claims, 8 Drawing Sheets

(51) Int. Cl.
| | |
|---|---|
| *G01J 1/42* | (2006.01) |
| *G01J 5/00* | (2006.01) |
| *H05B 37/02* | (2006.01) |
| *G08B 13/19* | (2006.01) |
| *F21V 23/04* | (2006.01) |

(52) U.S. Cl.
CPC ............. *G08B 13/19* (2013.01); *H05B 37/02* (2013.01); *H05B 37/0227* (2013.01); *F21V 23/0442* (2013.01)

(58) Field of Classification Search
USPC ................. 250/342, 347, 353, DIG. 1, 252.1
See application file for complete search history.

(56) References Cited

U.S. PATENT DOCUMENTS

| | | |
|---|---|---|
| 5,936,666 A | 8/1999 | Davis |
| 7,115,871 B1 | 10/2006 | Tracy et al. |
| 2009/0219388 A1 | 9/2009 | Zisa et al. |

OTHER PUBLICATIONS

A. Prati, et al., "An Integrated Multi-Modal Sensor Network for Video Surveillance", University of Modena and University of Bologna, Italy, VSSN '05, Nov. 11, 2005, Singapore, pp. 1-8.

PASSIVE INFRARED SENSOR SYSTEM FOR POSITION DETECTION

CROSS-REFERENCE TO PRIOR APPLICATIONS

This application is the U.S. National Phase application under 35 U.S.C. § 371 of International Application No. PCT/IB2013/050716, filed on Jan. 28, 2013, which claims the benefit of U.S. Provisional Patent Application No. 61/604,576, filed on Feb. 29, 2012. These applications are hereby incorporated by reference herein.

FIELD OF THE INVENTION

The present invention generally relates to the field of passive infrared sensor systems for detecting a position of a heat source.

BACKGROUND OF THE INVENTION

Motion detection is an important feature in intelligent lighting systems, which are activated when the presence of people is detected. A common and relatively cheap sensor for motion detection is the passive infrared (PIR) sensor. A conventional PIR sensor comprises a pyroelectric element, which generates a temporary voltage when it is heated or cooled, and a Fresnel lens (or other optical means) for focusing infrared (IR) radiation from a certain area (the sensing region of the PIR sensor) on the pyroelectric element. Typically, two or four pyroelectric elements are wired as opposite inputs to a differential amplifier to cancel increases of IR energy across the entire sensing region caused by a general temperature increase in the sensing region.

Commonly available PIR sensors are normally binary sensors, i.e., they can detect whether a heat source is present or not in the sensing region of the PIR sensor, but they cannot determine the position of the heat source within the sensing region. US 2009/0219388 shows a PIR sensor system comprising four PIR sensors focusing on the same area of observation, in which the field of vision is modulated and coded. To do this, for each of them, a combination of lenses, and thus beams, is masked. The combination is different for each sensor in order to associate a unique code with each beam and to provide data to locate a position and movement of a heat source. However, such a PIR sensor system has the drawback that custom-made masking elements have to be designed and installed for each sensor, which implies high production and installation costs. Further, all the PIR sensors have to focus on the same area, which implies that several PIR sensors have to be added to a standard presence detection system to achieve the position and movement detection functionality.

SUMMARY OF THE INVENTION

It is an object of the present invention to overcome the above mentioned drawbacks, and to provide an improved PIR sensor system. More specifically, it is an object of the invention to provide a PIR sensor system for detection of a position of a heat source, which can be manufactured at reduced cost.

These and other objects are achieved by means of a PIR sensor system having the features defined in the independent claim. Preferable embodiments of the invention are characterized by the dependent claims.

Therefore, according to an aspect of the present invention, a PIR sensor system is provided. The system comprises a first PIR sensor associated with a first sensing region and a second PIR sensor associated with a second sensing region. The first PIR sensor comprises a first sensing element configured to sense heat radiation from a first group of zones of the first sensing region and a second sensing element configured to sense heat radiation from a second group of zones of the first sensing region. The second PIR sensor comprises a third sensing element configured to sense heat radiation from a first group of zones of the second sensing region and a fourth sensing element configured to sense heat radiation from a second group of zones of the second sensing region. The first and second sensing regions partially overlap such that a zone of the first sensing region overlapping a zone of the second sensing region defines a detection cell and a non-overlapped zone defines another detection cell. Each detection cell is represented by a predetermined amplitude and a predetermined sign of a first output signal based on input signals from the first and second sensing elements of the first PIR sensor and a predetermined amplitude and a predetermined sign of a second output signal based on input signals from the third and fourth sensing elements of the second PIR sensor. Further, the PIR sensor system comprises a processing unit configured to associate the amplitude and sign of the first output signal and the amplitude and sign of the second output signal with one of the detection cells for determining in which of the detection cells a heat source is positioned.

The present invention uses the concept of having overlapping sensing regions of at least two PIR sensors, thereby providing a plurality of detection cells, wherein each detection cell is represented by (or encoded with) a certain combination of signal characteristics (amplitude and sign) of the first and second output signals. The processing unit may thus associate the characteristics of the output signals provided by the first and second PIR sensors with a certain detection cell. For example, one of the detection cells may be represented by the first output signal being −0.5 V and the second output signal being −1 V. When a heat source enters that detection cell, the corresponding first and second output signals are generated and provided to the processing unit, which thus is able to determine that a heat source is present in that particular detection cell by associating the signal characteristics of the first and second output signals (which, as mentioned above, are −0.5 V and −1 V, respectively) with that particular detection cell.

The inventors have found that the zones of the sensing regions of PIR sensors with at least two sensing elements can be utilized to encode an area by partially overlapping (or superposing) the sensing regions. Therefore, the nature of conventional PIR sensors is utilized to encode the sensing area of the PIR sensor system, thereby enabling localization of a heat source within the sensing area. Accordingly, no masking is needed (as in the prior art) and off-the shelf components can be used, which reduces production cost. The different signal characteristics (i.e. amplitude and sign) of each detection cell may e.g. depend on the detection cell's distance to the PIR sensors (proximity to a PIR sensor implies higher amplitude), if the detection cell comprises a non-overlapped zone (as a result of which one of the output signals will be zero or flat), and on the polarity of the sensing element/elements to which the detection cell is directed (which will determine the signs of the first and second input signals).

Further, the present invention is advantageous in that an increased sensing area of the PIR sensor system is provided with a reduced number of PIR sensors, since the first and second sensing regions only partially overlap (thereby covering a larger area than a single PIR sensor), as compared to the prior art, where four PIR sensors are focused on the same area (thereby covering the same area as a single PIR sensor). Further, with the present invention, merely two PIR sensors are needed to encode the sensing area of the PIR sensor system, whereby position detection functionality may be achieved with a reduced number of PIR sensors. However, it will be appreciated that the PIR sensor system according to embodiments of the present invention may comprise more than two PIR sensors for increasing the sensing area of the system, facilitating two-dimensional position detection and/or obtaining an increased number of detection cells represented by unique combinations of signal characteristics of the first and second output signals.

Further, it will be appreciated that the predetermined amplitude and the predetermined sign of the first and second output signals may be determined already at the manufacturing stage, but more preferably are estimated at the time of installation, either manually by an installer or by means of a calibration unit (which will be described in more detail further on in the present disclosure).

According to an embodiment of the present invention, the zones of the first group of zones of the first sensing region and the zones of the second group of zones of the first sensing region may be alternately arranged. Similarly, the zones of the first group of zones of the second sensing region and the zones of the second group of zones of the second sensing region may be alternately arranged. For example, the zones of a sensing region may be arranged in a striped pattern, with columns of the first group of zones alternating with columns of the second group of zones. Alternatively, the zones of a sensing region may be arranged in a check pattern. The present embodiment is advantageous in that the accuracy of the position determination is improved, as it provides an increased number of interfaces/junctions between zones of the first sensing region and zones of the second sensing region. A change in the output signal characteristics is provided each time a heat source enters a zone, such as when a heat source moves from one zone associated with one of the first and second sensing elements to an adjacent zone associated with the other one of the first and second sensing elements.

In an embodiment of the present invention, the PIR sensor system may further comprise a quantizing means (or quantizer) configured to quantize the first output signal into at least two, and preferably at least four, levels, and/or to quantize the second output signal into at least two, and preferably at least four, levels, which is advantageous in that more distinctive signal characteristics of the first and/or second output signals are provided, which facilitates processing and analysis of the output signals. In the case of two quantization levels, the output signals may, according to an illustrative (and non-limiting) example, be quantized using one threshold T1, wherein the output signal is rounded off to 0 if its amplitude and sign is between T1 and −T1, and rounded off to 0.5 V if its amplitude and sign is greater than T1, and rounded off to −0.5 V if its amplitude and sign is smaller than T1. Therefore, with a two-level quantization, three distinctive signal characteristic values (amplitude and sign) of the output signals may be obtained. In case of four quantization levels, two thresholds may be used and five distinctive signal characteristic values may be obtained according to the same principle. By quantizing the output signals, each detection cell may be represented by a combination of a distinctive quantized value of the first output signal (e.g. one of 0, 0.5 V and −0.5 V) and a distinctive quantized value of the second output signal (e.g. one of 0, 0.5 V and −0.5 V).

The number of quantization levels and/or the thresholds may e.g. be determined at the manufacturing stage, by a user or by statistical learning during usage of the system. The quantizing means may for instance be arranged at each PIR sensor, the processing unit or as a separate unit.

According to an alternative embodiment, the PIR sensor system may comprise a first quantizing means arranged at the first PIR sensor and configured to quantize the first output signal into at least two, and preferably at least four, levels, and/or a second quantizing means arranged at the second PIR sensor and configured to quantize the second output signal into at least two, and preferably at least four, levels. Except for the above-described advantages obtained by the quantization itself (such as more distinctive signal characteristics of the first and/or second output signals), the present embodiment is advantageous in that less information has to be transferred from the PIR sensors to the processing unit, as the quantized signals carry less information than a raw (unquantized) signal.

According to an embodiment, the number of detection cells with overlapped zones may be equal to or greater than the number of quantization levels. Therefore, the extent of the partial overlap of the first and second sensing regions may be determined by the number of quantization levels. The present embodiment is advantageous in that it provides more unique combinations of amplitude and sign of the first output signal and amplitude and sign of the second output signal for the detection cells. In other words, fewer detection cells are represented by the same signal characteristic combination, which reduces the risk of erroneous detection of the position of the heat source.

In an embodiment, each detection cell may be represented by a unique combination of a predetermined amplitude and a predetermined sign of the first output signal and a predetermined amplitude and a predetermined sign of the second output signal, which reduces the risk of erroneous detection of the position of the heat source. A particular combination of the signal characteristics of the first and second output signals may then only be associated with one of the detection cells.

Alternatively, some of the detection cells may be represented by the same combination of output signal characteristics.

According to an embodiment, the PIR sensor system may further comprise a first optical means adapted to direct the heat radiation from the first group of zones of the first sensing region on the first sensing element of the first PIR sensor and the heat radiation from the second group of zones of the first sensing region on the second sensing element of the first PIR sensor. Further, the system may comprise a second optical means adapted to direct the heat radiation from the first group of zones of the second sensing region on the third sensing element of the second PIR sensor and the heat radiation from the second group of zones of the second sensing region on the fourth sensing element of the second PIR sensor. The optical means may preferably include lenses, such as Fresnel lenses, but may also include e.g. segmented parabolic mirrors for directing the IR radiation. For example, each one of the optical means may comprise a first group of lenses arranged to direct IR radiation from the first group of zones on the first sensing element and a second group of lenses arranged to direct IR radiation from the second group of zones on the second sensing element.

According to an embodiment, the PIR sensor system may further comprise a first differential electronic component to which the first and second sensing elements of the first PIR sensor may be connected as opposite inputs, the first differential electronic component being configured to provide the first output signal, based on the input signals from the first and second sensing elements of the first PIR sensor. Further, the system may comprise a second differential electronic component to which the third and fourth sensing elements of the second PIR sensor are connected as opposite inputs, the second differential electronic component being configured to provide the second output signal based on the input signals from the third and fourth sensing elements of the second PIR sensor. The present embodiment is advantageous in that temperature change across the entire sensing regions is cancelled out, thereby reducing the risk of erroneous detection. The differential electronic components may e.g. be differential amplifiers.

Further, the first differential electronic component may be configured to provide the first output signal by subtracting the input signals from the first and second sensing elements of the first PIR sensor, and the second differential electronic component may be configured to provide the second output signal by subtracting the input signals from the third and fourth sensing elements of the second PIR sensor. Therefore, if the general temperature increases in the sensing region of one of the PIR sensors, both sensing elements of that PIR sensor will generate a voltage, which voltages will be subtracted from each other and thereby cancelled out, which results in zero (or flat) output signal.

According to an embodiment, the PIR sensor system may further comprise a first filter for filtering the first output signal for removing noise and/or a continuous signal component, and/or a second filter for filtering the second output signal for removing noise and/or a continuous signal component, which is advantageous in that it facilitates processing and analysis of the first and/or second output signals. The filters may e.g. be arranged at each PIR sensor, at the processing unit or as separate units in the system.

According to an embodiment of the present invention, the processing unit may be configured to determine in which of the detection cells a heat source is positioned at a predetermined time interval, whereby mapping of the position of the heat source may be obtained over time, which may be used for determining the motion direction and/or motion pattern of the heat source.

In an embodiment, the processing unit may be configured to determine a motion direction of a heat source, which e.g. may be achieved by determining the position of the heat source at a predetermined time interval, as described above, and/or by monitoring changes in the first and second output signals, such as changes of sign in the signal. Determining the motion direction of a heat source may be advantageous e.g. in lighting systems, as the lighting system may be controlled based on the motion direction, e.g. such that light is turned on in the direction of the motion and more light may be provided (or projected) in front of the heat source and less behind said heat source.

According to embodiments of the invention, the PIR sensor system may further comprise a calibration unit configured to determine the configuration of the first and second sensing regions, based on the first and second output signals, which is advantageous in that the PIR sensor system can be adapted to the local environment where it is set up. Further, the calibration unit may be configured to determine one or more of the coverage, orientation and spatial overlap of the first and second sensing regions. The present embodiments are advantageous in that information such as the coverage, orientation and spatial overlap of the first and second sensing regions does not need to be known in advance. Such information is not always available for all combinations of PIR sensors and optical means, in particular if the optical means and the PIR sensors are provided by different manufacturers. If a configuration map of a sensing region is available, it may still be merely indicative and may not account for mounting height and orientation of the PIR sensor. With the present embodiment, the PIR sensor system may be calibrated and adapted to the actual PIR sensors in the system, their sensing regions and their configuration relative to the environment in which the system is arranged.

According to an embodiment of the present invention, a lighting system is provided comprising a PIR sensor system as defined in any one of the preceding embodiments. The present embodiment is advantageous in that the lighting system may adapt the illumination to the presence and/or position of a heat source detected by the PIR sensor system.

In another embodiment, an HVAC (heat, ventilation and air conditioning) system may be provided comprising a PIR sensor system as defined in any one of the preceding embodiments. Further, the PIR sensor system according to the present invention may be comprised in any system in which position detection of heat sources is desired. It will be appreciated that the PIR sensor system according to the present invention may also be used for providing information to several different systems, such as a lighting system and an HVAC system.

It is noted that the invention relates to all possible combinations of features recited in the claims. Further objectives of, features of, the present invention, and advantages thereof, will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

These and other aspects of the present invention will now be described in more detail, with reference to the appended drawings showing embodiments of the invention.

FIG. 2b shows an output signal provided by the PIR sensor when a person walks across the sensing region shown in FIG. 2a.

FIG. 3 shows a sensing area with detection cells of the PIR sensor system shown in FIG. 1 and the predetermined amplitude and predetermined sign of the first and second output signals, which each detection cell is represented by.

FIGS. 4a-4d show a test situation when a person walks across a room in which the PIR sensor system of FIG. 1 is installed, wherein:

FIG. 4a is a schematic top view of the room at certain points in time,

FIG. 4b shows generated output signals as a function of time,

FIG. 4c shows the output signals after quantization, and

FIG. 4d shows the position of the person estimated by a processing unit of the PIR sensor system.

All the figures are schematic, not necessarily to scale, and generally only show parts which are necessary to elucidate the invention, wherein other parts may be omitted or merely suggested.

DETAILED DESCRIPTION OF THE EMBODIMENTS

Figure 1:
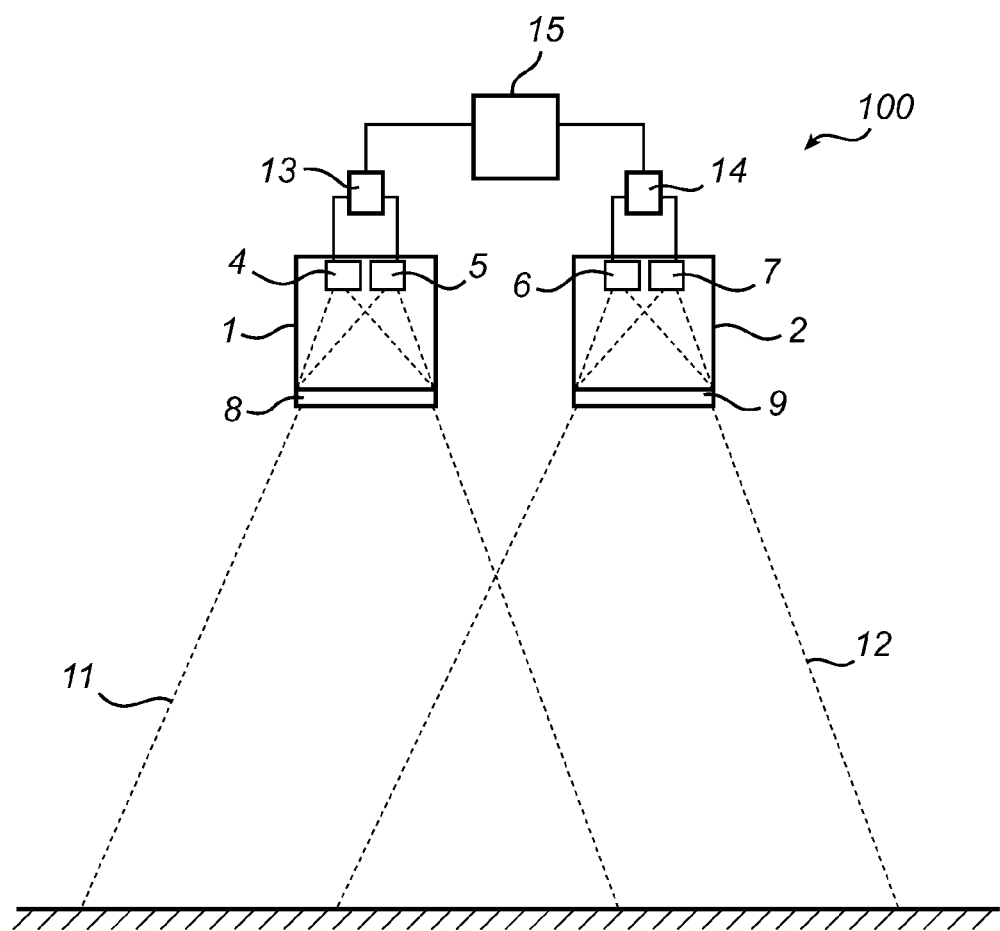
FIG. 1 is a schematic view of a PIR sensor system according to an embodiment of the present invention.

With reference to FIG. 1, a PIR sensor system according to an embodiment of the present invention will be described.

FIG. 1 shows a schematic view of a PIR sensor system 100 comprising a first PIR sensor 1 associated with a first sensing region 11 and a second PIR sensor 2 associated with a second sensing region 12. The first and second PIR sensors 1, 2 are arranged such that the first and second sensing regions 11, 12 partially overlap. The first PIR sensor 1 comprises a first sensing element 4, a second sensing element 5 and a first Fresnel lens 8 (or any other appropriate optical means) adapted to direct (or focus) heat radiation from a first group of zones (not shown in FIG. 1) of the first sensing region 11 to the first sensing element 4 and heat radiation from a second group of zones (not shown in FIG. 1) of the first sensing region 11 to the second sensing element 5. Similarly, the second PIR sensor 2 comprises a third sensing element 6, a fourth sensing element 7 and a second Fresnel lens 9 (or any other appropriate optical means) adapted to direct heat radiation from a first group of zones (not shown in FIG. 1) of the second sensing region 12 to the third sensing element 6 and heat radiation from a second group of zones (not shown in FIG. 1) of the second sensing region 12 to the fourth sensing element 7.

The sensing elements 4-7 may comprise pyroelectric material, which generates a temporary voltage when it is heated or cooled. Preferably, the sensing elements 4-7 are sensitive to IR radiation of wavelengths around 9.4 µm, which is the wavelength at which the IR radiation from a human body is strongest. For example, the sensing elements 4-7 may be sensitive to wavelengths within the interval 1-20 µm. For example, the sensing elements may be made of a pyroelectric material, such as gallium nitride, caesium nitrate or polyvinyl fluorides, which are sensitive to IR radiation over a wide range. A filter window may be arranged in front of each sensing element for limiting the IR radiation reaching the pyroelectric material to radiation within the interval of 8-14 µm.

The first and second sensing elements 4, 5 are wired as opposite inputs to a first differential electronic component 13, such as a differential amplifier, configured to provide a first output signal based on input signals from the first and second sensing elements 4, 5. Therefore, the temporary voltage generated by a sensing element being heated or cooled provides the input signal on which the output signal is based. Preferably, the first differential electronic component 13 provides the first output signal by subtracting the input signals generated by the first and second sensing elements 4, 5, such that general temperature changes across the entire first sensing region 11 are cancelled out. Similarly, the third and fourth sensing elements 6, 7 are wired as opposite inputs to a second differential electronic component 14, such as a differential amplifier, configured to provide a second output signal based on input signals from the third and fourth sensing elements 6, 7. Preferably, the second differential electronic component 14 provides the second output signal by subtracting the input signals generated by the third and fourth sensing elements 6, 7, such that general temperature changes across the entire second sensing region 12 are cancelled out. The first and second differential electronic components 13, 14 may e.g. be arranged at the first and second PIR sensor 1, 2, respectively, or as separate units.

Further, the PIR sensor system 100 comprises a processing unit 15, such as a central processing unit, CPU 15, configured to determine a position of a heat source in the sensing area of the PIR sensor system 100 (i.e. in the region covered by the first and second sensing regions 11, 12) based on the first and second output signals provided by the first and second differential electronic components 13, 14. Filters (not shown) may be provided for filtering the first and/or second output signals for removing noise and/or a continuous signal component. The filters may preferably be provided at each PIR sensor 1, 2, but may alternatively be arranged at the CPU 15 or as separate units. The CPU 15 may be connected to a lighting system or lighting device (not shown) and configured to control the lighting system, based on the position detection of the heat source.

Figure 2A:
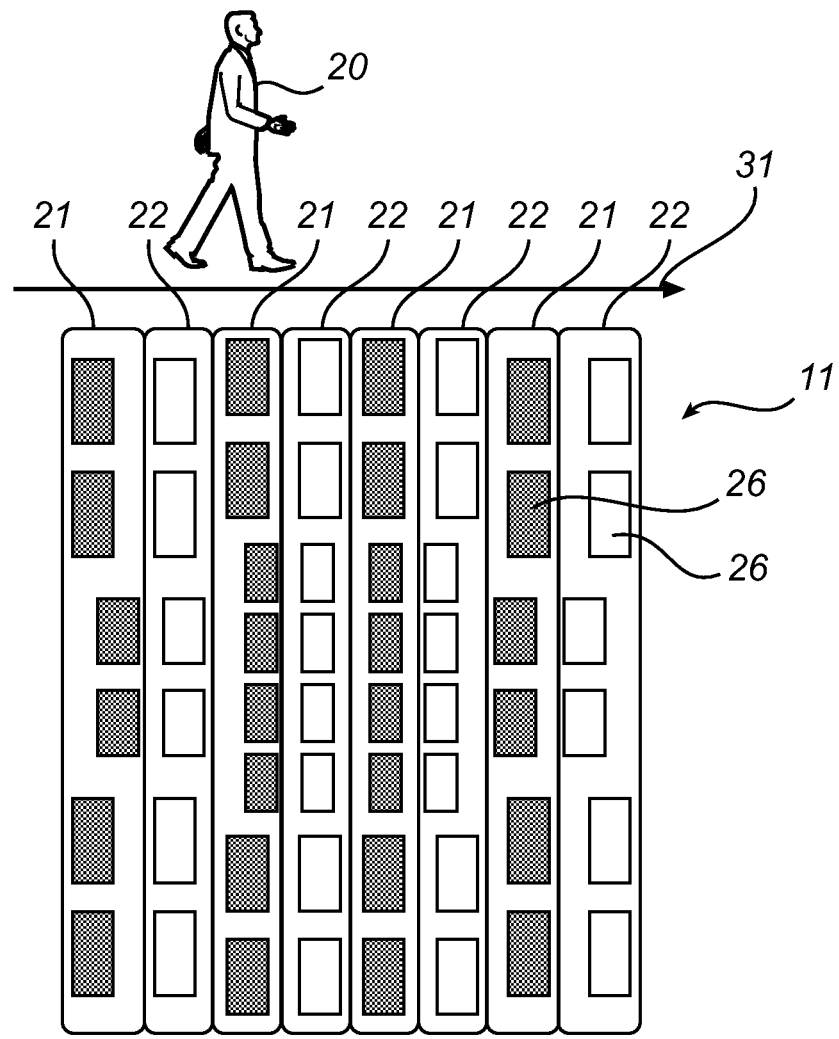
FIG. 2a shows a sensing region of a PIR sensor of the PIR sensor system shown in FIG. 1.
Figure 2B:

With reference to FIGS. 2a and 2b, the first sensing region 11 of the first PIR sensor 1 in the PIR sensor system 100 will be described.

FIG. 2a shows the first sensing region 11 of the first PIR sensor 1. The Fresnel lens 8 directs IR radiation from zones 21 of the first group of zones to the first sensing element 4 and from zones 22 of the second group of zones to the second sensing element 5. Preferably, the Fresnel lens 8 may be configured such that the zones 21 of the first group of zones are alternately arranged with the zones 22 of the second group of zones in a striped pattern, as shown in FIG. 2a. Optionally, each zone 21, 22 may be divided into subzones 26 (for clarity reasons, merely two subzones are marked with reference numbers in FIG. 2a) arranged in columns, wherein each column provides a zone 21, 22.

In the present embodiment, the position and/or movement of a person 20 (or heat source) may be determined along the direction, indicated by arrow 31, extending across the lateral direction of the zones 21, 22. When a person 20 walks across the first sensing region 11 in the direction 31, and thus crosses the alternately arranged zones 21, 22, the first PIR sensor 1 will provide a first output signal 25 varying over time as shown in FIG. 2b. In the present example, the first sensing element 4 is wired as a positive input, and the second sensing element 5 as a negative input, to the first differential component 13, whereby a positive peak of the first output signal 25 is provided when the person 20 enters a zone 21 of the first group of zones and a negative peak is provided when the person 20 enters a zone 22 of the second group of zones.

It will be appreciated that the structure of the second sensing region 12 and the operation principle of the second PIR sensor 2 may be identical to the structure of the first sensing region 11 and the operation principle of the first PIR sensor 1 as described in the above.

Figure 3:
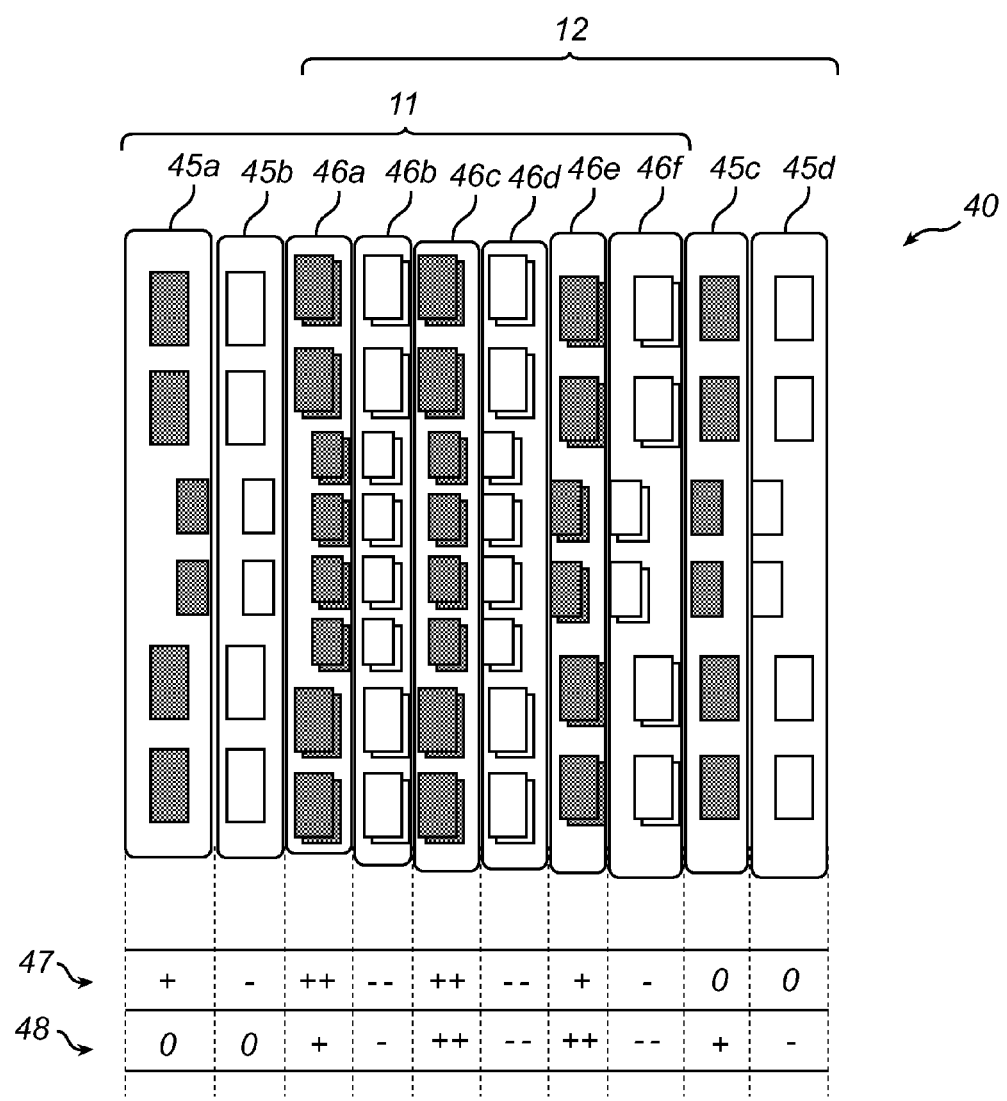

With reference to FIG. 3, the sensing area 40 (i.e. the coverage area) of the PIR sensor system 100 will be further described. The sensing area 40 is formed by the two overlapping sensing regions 11, 12 of the first and second PIR sensor 1, 2. The first and second sensing regions 1, 2 partially overlap such that zones of the first sensing region 11 overlapping zones of the second sensing region define detection cells 46a-46f and non-overlapped zones define other detection cells 45a-45d. In the present example, the two leftmost detection cells 45a, 45b each comprise one non-overlapped zone of the first sensing region 11 and the two rightmost detection cells 45c, 45d each comprise one non-overlapped zone of the second sensing region 12. Further, the central six detection cells 46a-46f comprise overlapped (or superposed) zones of the first and second sensing regions 11, 12.

Each detection cell is represented by a particular combination of a predetermined amplitude and a predetermined sign of the first output signal, as illustrated in the row indicated by reference number 47, and a predetermined amplitude and a predetermined sign of the second output signal, as illustrated in the row indicated by reference number 48. The amplitude is determined by the distance from the detection cell to the PIR sensors such that zones closer to the edges of a sensing region are represented by a lower amplitude (illustrated by − and +) and zones closer to the center of a sensing region are represented by a larger amplitude (illustrated by −− and ++). The sign is determined by the wiring between the input of the sensing element associated with the zone and the differential electronic component. In the present example, the zones 21 of the first group of zones of the first sensing region 11 and the zones of the first group of zones of the second sensing region 12 are represented by a positive sign (illustrated by + and ++), and zones of the second group of zones 22 of the first sensing region 11 and zones of the second group of zones of the second sensing region 12 are represented by a negative sign (illustrated by − and −−). For example, the detection cell indicated by reference number 45a is represented by the predetermined first and second output signal characteristics + and 0, wherein + represents the first output signal and 0 the second output signal, as the detection cell 45a comprises a non-overlapped zone at the edge of the first sensing region 11 and does not comprise any zone of the second sensing region 12. Therefore, if the first output signal is a small positive signal (as determined using e.g. certain thresholds) and the second output signal is zero (or flat), a person (i.e. a heat source) is detected to be in the detection cell indicated by reference number 45a, i.e. on the extreme left of the sensing area 40. As a further example, the detection cell indicated by reference number 46c is represented by the predetermined first and second output signal characteristics ++ and ++, respectively. Therefore, if both the first and second output signals are large positive signals (as determined using e.g. certain thresholds), the person is detected to be in the detection cell indicated by reference number 46c, i.e. close to the center of the sensing area 40.

The PIR sensor system 100 may further comprise quantizing means or a quantizer (not shown) configured to quantize the first and second output signals according to a quantizing scheme. The signals may e.g. be quantized into four levels (excluding the zero level.) using two thresholds T1 and T2 according to the following scheme:

$$s_q = \begin{cases} 0 & \text{if } s \in [-T1, T1] \\ + & \text{if } s \in [T1, T2] \\ - & \text{if } s \in [-T1, -T2] \\ ++ & \text{if } s > T2 \\ -- & \text{if } s < -T2 \end{cases} \quad \text{(Equation 1)}$$

where s is the unquantized output signal and sq is the quantized signal. The thresholds may e.g. be T1=0.05 V and T2=0.4 V. It will be appreciated that the signs +, ++, − and −− are symbolic and may represent actual signal values of the quantized signal, such as e.g. 0.5 V, 1 V, −0.5 V and −1 V, respectively.

The combination of signal characteristics, which the detection cells are represented by (or encoded with), is determined by the extent and configuration of the overlap of the first and second sensing regions 11, 12. In the present example, each detection cell is represented by a unique combination of a predetermined amplitude and a predetermined sign of the first output signal and a predetermined amplitude and a predetermined sign of the second output signal, as illustrated in FIG. 3. The use of unique combinations is preferable, as one combination of the signal characteristics of the first and the second output signal may then be associated with a single detection cell. For increasing the number of unique combinations, the number of detection cells with overlapped zones may be equal to or greater than the number of quantization levels, which in the present example with four quantization levels means that at least four detection cells may comprise overlapped zones. If fewer detection cells comprise overlapped zones, non-unique combinations will be obtained. In an embodiment (not shown), detection cells may comprise partially overlapped zones, thereby allowing a finer heat source localization, which, however, may be more noisy.

Figure 4A:
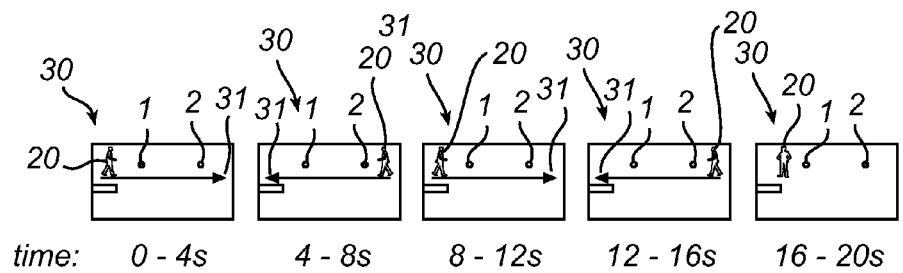

The operation principle of the PIR sensor system 100 according to an embodiment of the present invention will be described with reference to FIGS. 4a-4d. FIG. 4a is a schematic top view of a room 30 at certain points in time, FIG. 4b shows the first and second output signals generated in the PIR sensor system 100 as a function of time, FIG. 4c shows the first and second output signals after quantization, and FIG. 4d shows the position of a person 20 estimated by the CPU 15 of the PIR sensor system 100.

The PIR sensor system 100 was tested in an experimental setup, wherein the first and second PIR sensors 1, 2 were arranged in the room 30 at a distance of about 2.5 m from the floor, and the sensing area 40 covered by the PIR sensor system 100 was about 6×7.5 m. The layout of the sensing area 40 (and the overlap) was configured as described above with reference to FIG. 3. During the test, the person 20 walked from the left side to the right side of the room 30 and back two times and then stopped on the left side of the room 30 for a few seconds, as illustrated in FIG. 4a.

Figure 4B:
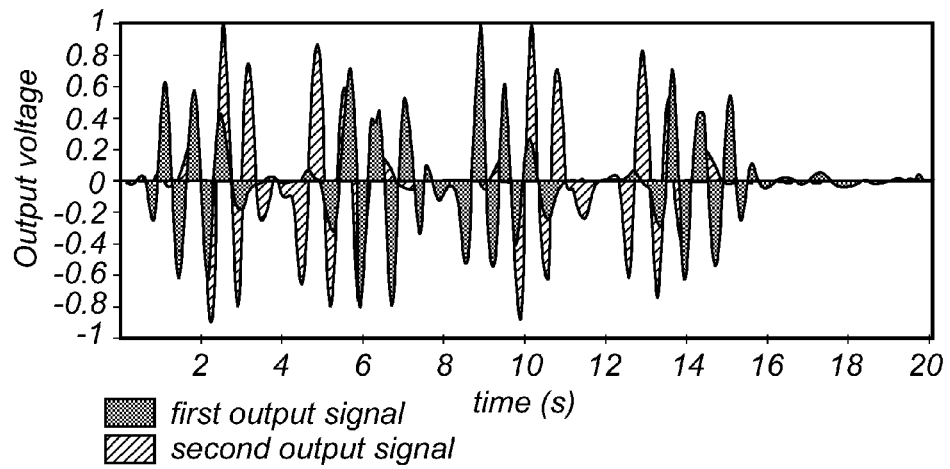
Figure 4C:
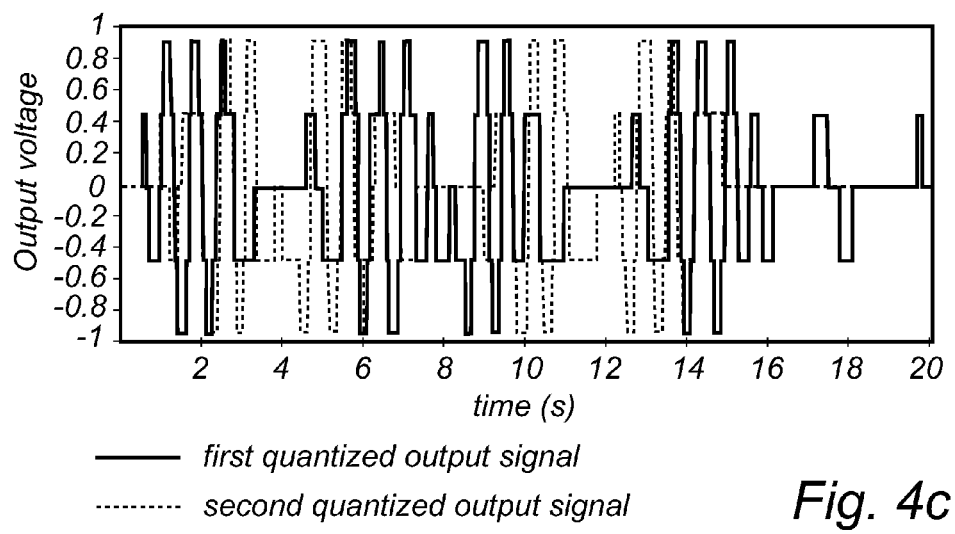
Figure 4D:
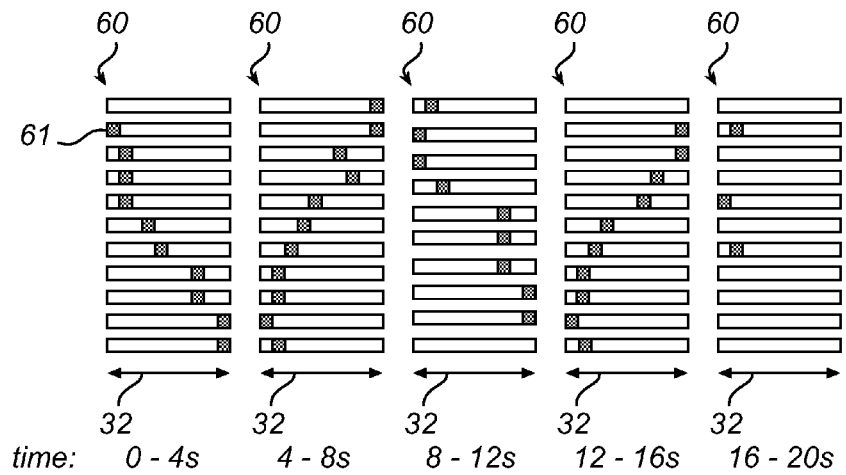

The unquantized first and second output signals generated by the first and second PIR sensors 1, 2, respectively, during the test are plotted in FIG. 4b and the first and second output signals after quantization according to equation 1 are plotted in FIG. 4c. The CPU 15 was configured to associate the amplitude and sign of the first output signal and the amplitude and sign of the second output signal with one of the detection cells for determining in which of the detection cells the person 20 was positioned. Therefore, by analyzing the amplitude (or magnitude) and sign of the quantized first and second output signals, the CPU 15 determined the position of (or localized) the person 20 within the sensing area 40 by using the encoding shown in FIG. 3. FIG. 4d shows the position of the person estimated by the CPU 15, wherein the location of the person 20 is plotted every 0.4 s. The position of the person 20 in the room 30 is indicated by the squares 61 (for clarity reasons, merely one of the squares is marked with reference number 61) which extend over the range of the room's dimension as indicated by arrows 32. As can be seen in FIGS. 4a and 4d, the localization estimated by the CPU 15 follows the motion of the person 20 from the left side to the right side of the room 30 and back, two times. During the last seconds of the test (represented by the rightmost column in FIG. 4d), the person 20 was standing still on the left side of the room 30, and thus only three detections occurred in this area.

The localization of a heat source may be further enhanced by correcting (minor) errors using tracking techniques, such as a Kalman filter, particle filters or Hidden Markov Models, making the localization more robust.

For improving the functioning of the PIR sensor system, the configuration of the first and second sensing regions (or the sensing area of the PIR sensor system) may preferably be known to the processing unit. The configuration of the first and second sensing regions may include one or more of the coverage, orientation and spatial overlap of the first and second sensing regions, and may depend on the configurations of the PIR sensors, the optical means, and their orientation and distance relative to each other. From the information about the configuration of the sensing area, the expected configuration of the first and second output signals can be derived and the predetermined amplitudes and predetermined signs of the first and second output signals can be set for each detection cell.

The information about the configuration of the sensing area may be obtained from the manufacturer of the PIR sensors and the optical means, and may be preset prior to or during installation of the PIR sensor system. However, such information is not always available, in particular if the PIR sensors and optical means come from different manufacturers, and if the information is available, it is often only indicative and may vary depending on the installation settings (mainly with variations in installation height). The PIR sensor system may therefore comprise, according to an embodiment of the invention, a calibration unit configured to determine the configuration of the first and second sensing regions based on the first and second output signals. The calibration unit may be configured to determine one or more of the coverage, orientation and spatial overlap of the first and second sensing regions. A calibration method, according to which the PIR sensor system may be calibrated, will be described in the following. The calibration unit may be comprised in the CPU or may be a separate unit.

The calibration method includes that the installer or user may walk about following a pre-defined trajectory (or pattern or path) in the area approximately covered by the PIR sensor system (i.e., the sensing area). The trajectory points may be detected by the PIR sensors and signalled to a processing unit (such as the CPU described with reference to FIG. 1) which may preferably comprise a memory. The pre-defined trajectory may be adapted to the configuration of the PIR sensor system which is calibrated. For example, if the PIR sensors each comprise two sensing elements, as described with reference to FIG. 1, a simpler calibration pattern may be required than if the PIR sensors each comprise four sensing elements.

Further, the calibration unit (or the processing unit) may be configured to analyze the configuration of the first and second output signals (or the shape of the PIR sensors' output voltage) generated in response to this known motion (i.e. the motion of the installer along the pre-defined trajectory), and determine (or calculate) the configuration of the first and second sensing regions, based on said analysis, e.g. by determining the geometry (or configuration) of the optical means and/or the spatial shift between the first and second PIR sensors. Further, the calibration unit (or processing unit) may be configured to set the predetermined amplitude and predetermined sign of the first and second output signals for each detection cell, thereby encoding the sensing area of the PIR sensor system. After completion of the calibration method, the PIR sensor system is set for localization and tracking of heat sources.

With reference to FIGS. 5a-9b, a more detailed example of a calibration method will be described. In the present example, the calibration procedure was conducted for a PIR sensor system 100 as described with reference to FIGS. 1-3, which system was installed in a test room 30 (as described with reference to FIGS. 4a-4d). However, it will be appreciated that the system and method described in the following also may be extended to other types of PIR sensors, including those with four sensing elements.

The sensing region 11, 12 of each PIR sensor 1, 2 has three types of regions, which are reflected in the map representing its configuration, as shown in FIG. 2a, wherein the expected PIR sensor response is expressed as 0 (no response/out of range), +1 (positive difference voltage) and −1 (negative difference voltage), where +1 would correspond to the dark zones 21 and −1 to the light zones 22 in FIG. 2a (or vice versa). In order to estimate the configuration of the PIR sensor system 100, an installer may calibrate the system by walking according to a predefined pattern in the area 40 covered by the PIR sensors 1, 2. The start and termination of the calibration procedure may be signalled to the PIR sensor system 100 e.g. using a remote control. In this case, with two sensing element-type PIR sensors, the walking pattern may comprise walking in two perpendicular directions (one direction parallel with, and one direction perpendicular to, the longitudinal direction of the column-like zones 21, 22) under the PIR sensors 1, 2. If standard mounting systems are employed, the orientation of the PIR sensors 1, 2 relative to their associated optical means 8, 9 may be observable and therefore known.

Figure 5A:
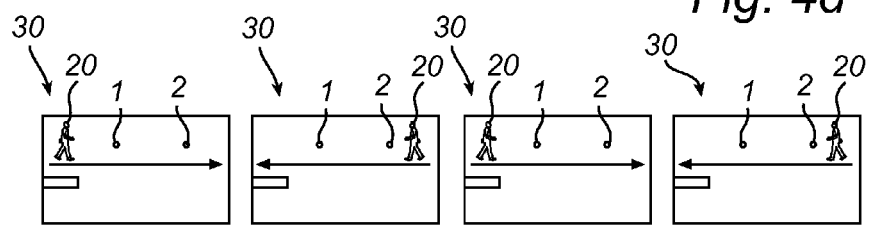
FIGS. 5a-5d illustrate a calibration method according to an embodiment of the present invention.

In the present example, a person 20 may first walk under the PIR sensors 1, 2 from left to right and back, twice, thereby covering the whole area of the room 30 (excluding approximately 70 cm occupied by a desk, on the left side of the room), as shown in FIG. 5a. The resulting output signals of the two PIR sensors 1, 2 are plotted in FIG. 5b, wherein the solid line represents the first output signal and the dashed line represents the second output signal. The output signals may preferably be bandpass filtered with cutoff frequencies at 0.3 Hz and 8 Hz to remove the continuous signal component and any high frequency noise.

Figure 5B:
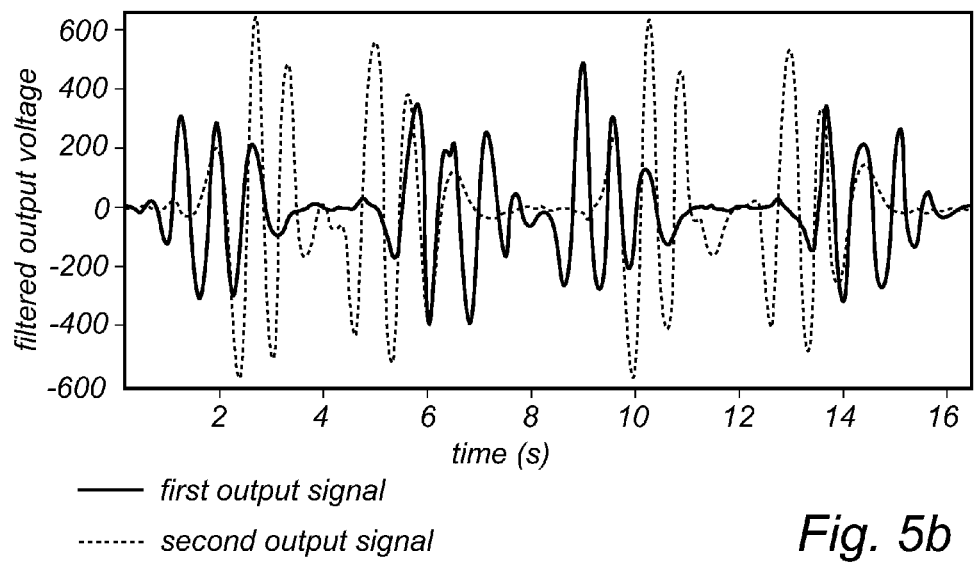
Figure 5C:
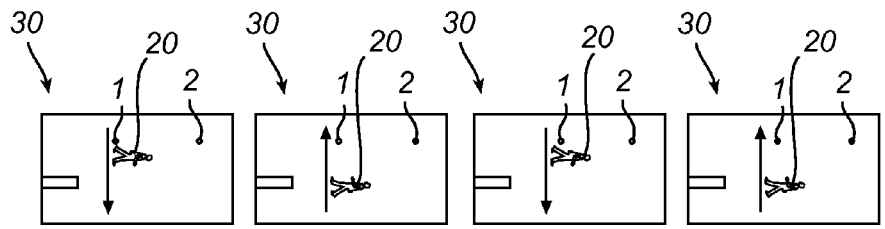
Figure 5D:
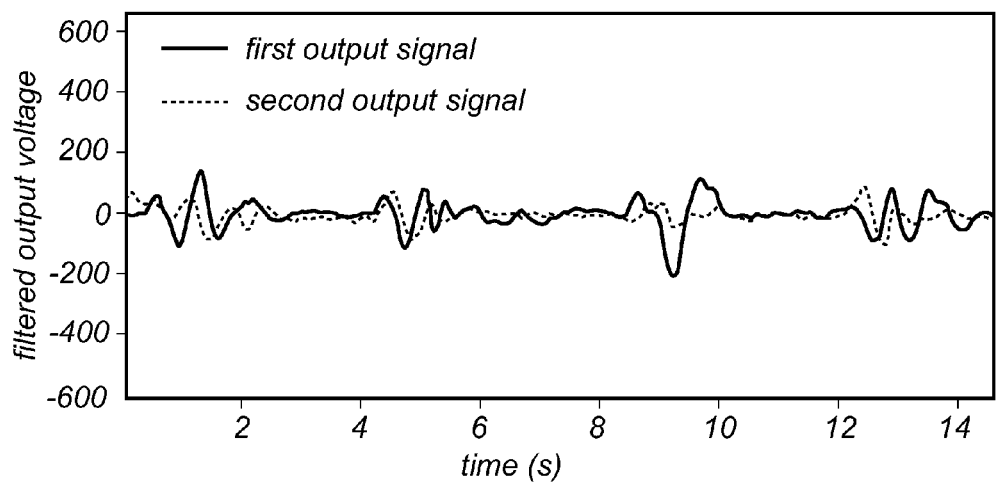

Further, the installer 20 may walk in the perpendicular direction under the first PIR sensor 1 back and forth four times, as shown in FIG. 5c, and under the second PIR sensor 2 back and forth four times (not shown). The resulting output signals from the walk under the first PIR sensor 1 are plotted in FIG. 5d. The range of the y-axis in FIG. 5d is the same as the range of the y-axis in FIG. 5b and, as can be seen, the amplitude of the output signals shown in FIG. 5d is significantly smaller than the amplitude of the output signals shown in FIG. 5b. This is because two sensing element-type PIR sensors are more sensitive to changes in temperature in the direction perpendicular to the longitudinal direction of the column-like zones 21, 22 and less sensitive in the direction parallel to the longitudinal direction of the column-like zones 21, 22, because of the geometry of the sensing regions. The output signals, when the installer walks under the second PIR sensor 2 in the same direction as shown in FIG. 5c, are similar to the output signals shown in FIG. 5d.

Figure 6:
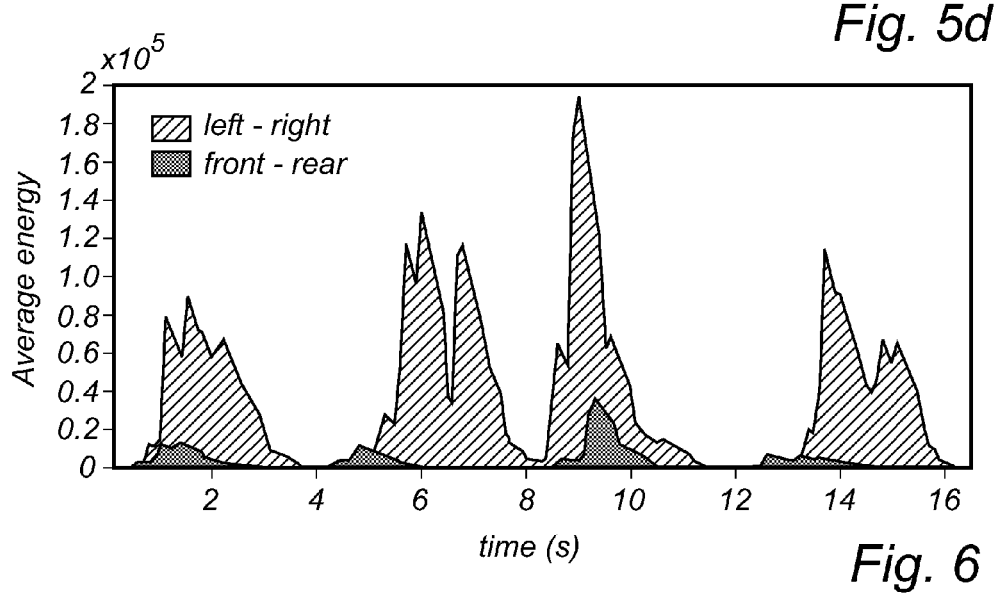
FIG. 6 shows output signal energy as a function of time.

By analyzing the sensed output signals, the PIR sensors' orientation may be inferred by computing the ratio between the average output signal energies when the installer walks in the two perpendicular directions. In FIG. 6, the energies of the first output signal are plotted when the installer 20 walks four times from left to right (i.e. the walk illustrated in FIG. 5a), and when the installer 20 walks four times from the front to the rear of the room (i.e. from the top to the bottom in the figures, as the walk illustrated in FIG. 5c). The ratio between the average energy per sample in the two cases in FIG. 6 is ten, i.e. the output signal energy is ten times higher on average when someone walks from the left to the right in the room than from the front to the rear of the room (i.e. from the top to the bottom in the figures). By using this measure, it is possible to determine how the first PIR sensor 1 is oriented and that it has low sensitivity along the vertical direction and high sensitivity along the horizontal direction. In the present example, it may be most interesting to determine the sensing area configuration along the direction of higher sensitivity, which is the horizontal (left-right) direction, which may be determined using the energy analysis described with reference to FIG. 6.

Figure 7:
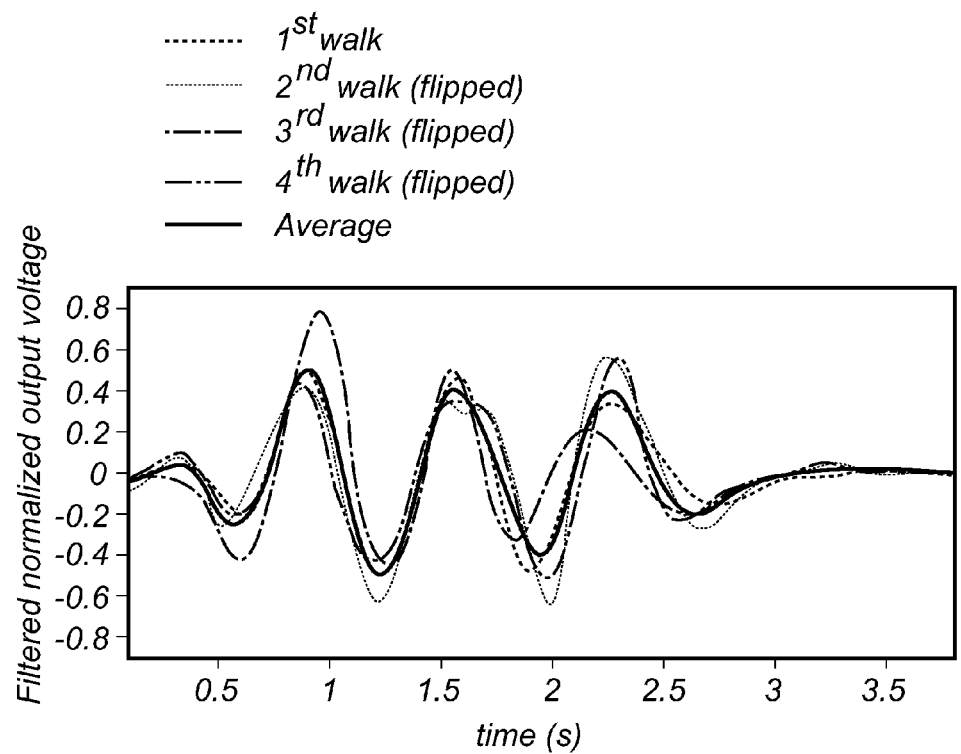
FIG. 7 shows normalized output signals.

After the calibration procedure, the maximum value recorded at each PIR sensor may be used to normalize the output signals recorded during the calibration. After normalization, the maximum value during calibration equals 1 and all other values may be scaled accordingly. In the following, the normalized signals are considered when the installer 20 walks in the horizontal direction (left-right) in the room 30, and focus is directed toward the first output signal, as illustrated in FIG. 5b. If the output voltage signal is segmented into four parts corresponding to the four walks, two of them are flipped to account for the walking direction and the four signals are plotted together, resulting in the plot shown in FIG. 7. As can be seen in FIG. 7, the signals are very similar. The average of the four signals is plotted in FIG. 7 with a thick black line. The average signal may then be quantized to learn the configuration of the first sensing region using a threshold T, according to the rule:

$$s_q = \begin{cases} 0 & \text{if } s \in [-T, T] \\ +1 & \text{if } s > T \\ -1 & \text{if } s < -T \end{cases} \quad \text{Equation (2)}$$

Figure 8:
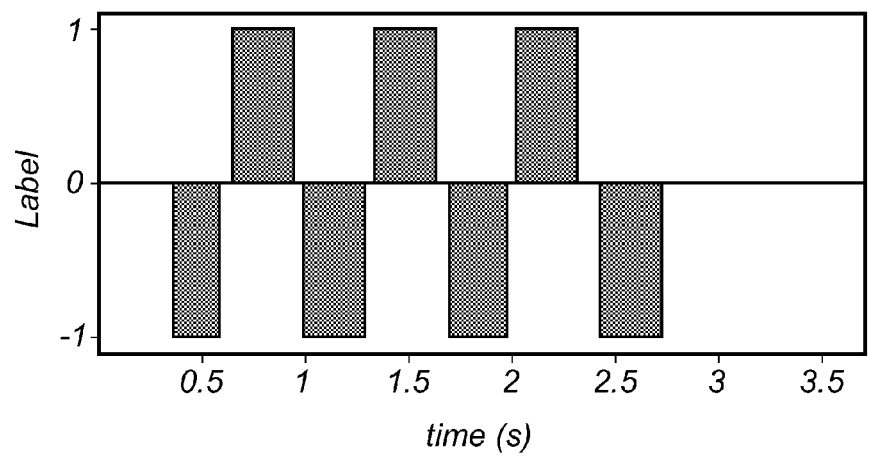
FIG. 8 shows a quantized average output signal.
Figure 9A:
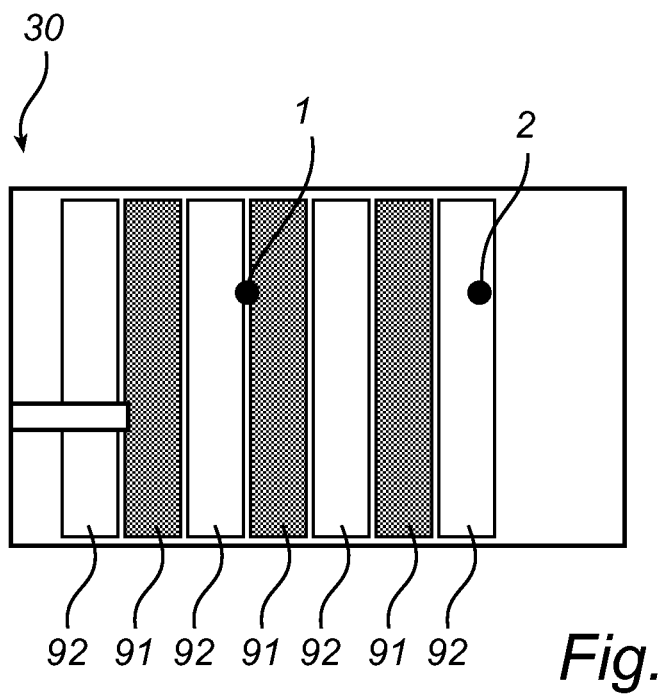
FIGS. 9a and 9b show maps of the sensing regions of the first and second PIR sensors obtained by the calibration method.
Figure 9B:
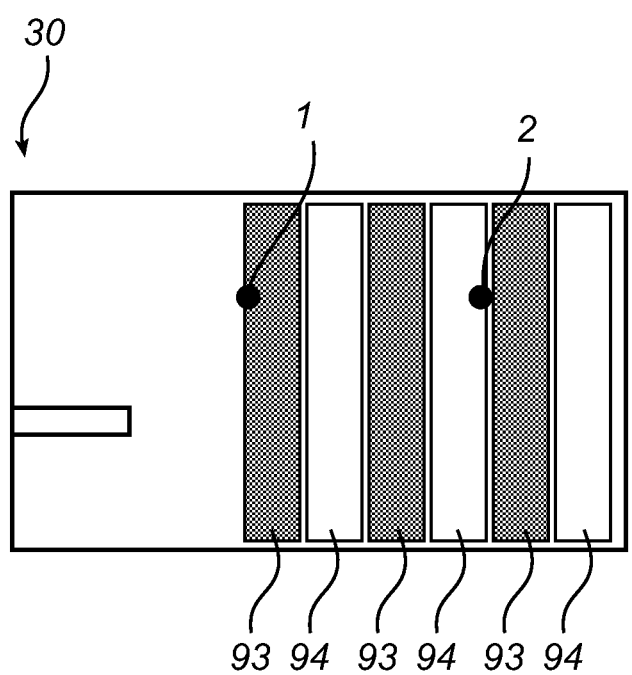

In the present example, T=0.1 (10% of the maximum signal value). The quantized average signal shown in FIG. 7 is shown in FIG. 8. At this point, the expected polarity of the first output signal for each zone (or room position) may be estimated, as illustrated in the map shown in FIG. 9a. It will be appreciated that the map may be adapted to the installation at hand. Light patches 92 indicate that a negative output voltage is expected in these zones, dark patches 91 indicate that a positive output voltage is expected and in the areas between and outside the patches 91, 92, zero (or very low) response is expected. A similar procedure for the second PIR sensor will lead to a similar map, which is shown in FIG. 9b, with light patches 94 indicating that a negative output voltage is expected in these zones, dark patches 93 indicating that a positive output voltage is expected and the areas between and outside the patches 93, 94, indicate that zero (or very low) response is expected.

The person skilled in the art realizes that the present invention by no means is limited to the preferred embodiments described above. On the contrary, many modifications and variations are possible within the scope of the appended claims. For example, two dimensional spatial localization may e.g. be achieved by using segmented PIR sensors with four sensing elements or by arranging pairs of PIR sensors along different directions (e.g. such that a first pair of PIR sensors are perpendicularly oriented with respect to a second pair of PIR sensors).

Further, the position estimation process may be performed for sub-groups of neighbouring sensors to reduce the amount of communication needed. In that case, hybrid sensor network topologies may be provided, wherein a plurality of sensors perform basic operations, such as filtering and/or quantization, and a few smarter, more powerful sensors aggregate the information from the neighbouring sensors and perform heat source localization at a local level.

The invention claimed is:
1. A passive infrared (PIR) sensor system, comprising:
a first PIR sensor associated with a first sensing region, the first PIR sensor comprising a first sensing element configured to sense heat radiation from a first group of zones of the first sensing region and a second sensing element, which is distinct from the first sensing element, configured to sense heat radiation from a second group of zones of the first sensing region, wherein at least one zone of the first group of zones is associated with the first sensing element but not the second sensing element and at least one zone of the second group of zones, adjacent to the at least one zone of the first group of zones, is associated with the second sensing element but not the first sensing element;
a second PIR sensor associated with a second sensing region, the second PIR sensor comprising a third sensing element configured to sense heat radiation from a first group of zones of the second sensing region and a fourth sensing element, which is distinct from the third sensing element, configured to sense heat radiation from a second group of zones of the second sensing region, wherein at least one zone of the first group of zones of the second region is associated with the third sensing element but not the fourth sensing element and at least one zone of the second group of zones of the second region, adjacent to the at least one zone of the first group of zones, is associated with the fourth sensing element but not the third sensing element;
wherein the first and second sensing regions partially overlap such that an overlapped zone of the first sensing region overlapping a zone of the second sensing region defines a plurality of detection cells and a non-overlapped zone defines another detection cell;
wherein the sensor system is configured to represent each detection cell with a predetermined amplitude and a predetermined sign of a first output signal based on input signals from the first and second sensing elements of the first PIR sensor and with a predetermined amplitude and a predetermined sign of a second output signal based on input signals from the third and fourth sensing elements of the second PIR sensor, each predetermined amplitude determined by a distance from the detection cell to the first and second PIR sensors, and each predetermined sign determined by a wiring between input of the sensing element associated with the zone and a differential electronic component, the PIR sensor system further comprising:
a processing unit configured to associate the amplitude and sign of the first output signal and the amplitude and sign of the second output signal with one of the detection cells to determine a position of a heat source within the first and second sensing regions.
2. The PIR sensor system as defined in claim 1, wherein the zones of the first group of zones of the first sensing region and the zones of the second group of zones of the first sensing region are alternately arranged, and the zones of the first group of zones of the second sensing region and the zones of the second group of zones of the second sensing region are alternately arranged.

3. The PIR sensor system as defined in claim 1, wherein the sensor system further comprises a quantizer configured to quantize the first output signal using at least one threshold into at least two, and preferably at least four, levels, and/or to quantize the second output signal using at least one threshold into at least two, and preferably at least four, levels, such that each detection cell is represented by the quantized value of the first output signal and the quantized value of the second output signal.

4. The PIR sensor system as defined in claim 3, wherein a number of the plurality of detection cells is equal to or greater than the number of quantization levels.

5. The PIR sensor system as defined in claim 1, wherein the sensor system further comprises:
a first quantizer arranged at the first PIR sensor and configured to quantize the first output signal using at least one threshold into at least two, and preferably at least four, levels, and/or
a second quantizer arranged at the second PIR sensor and configured to quantize the second output signal using at least one threshold into at least two, and preferably at least four, levels;
wherein each detection cell is represented by the quantized value of the first output signal and the quantized value of the second output signal.

6. The PIR sensor system as defined in claim 1, wherein each detection cell comprises a unique combination of the predetermined amplitude and the predetermined sign of the first output signal and the predetermined amplitude and the predetermined sign of the second output signal.

7. The PIR sensor system as defined in claim 1, further comprising:
a first optical means adapted to direct the heat radiation from the first group of zones of the first sensing region on the first sensing element of the first PIR sensor and the heat radiation from the second group of zones of the first sensing region on the second sensing element of the first PIR sensor; and
a second optical means adapted to direct the heat radiation from the first group of zones of the second sensing region on the third sensing element of the second PIR sensor and the heat radiation from the second group of zones of the second sensing region on the fourth sensing element of the second PIR sensor.

8. The PIR sensor system as defined in claim 1, further comprising:
a first differential electronic component to which the first and second sensing elements of the first PIR sensor are wired as opposite inputs, the first differential electronic component being configured to provide said first output signal based on the input signals from the first and second sensing elements of the first PIR sensor using subtraction; and
a second differential electronic component to which the third and fourth sensing elements of the second PIR sensor are wired as opposite inputs, the second differential electronic component being configured to provide said second output signal based on the input signals from the third and fourth sensing elements of the second PIR sensor using subtraction.

9. The PIR sensor system as defined in claim 8, wherein:
the first differential electronic component is configured to provide the first output signal by subtracting the input signals from the first and second sensing elements of the first PIR sensor; and
the second differential electronic component is configured to provide the second output signal by subtracting the input signals from the third and fourth sensing elements of the second PIR sensor.

10. The PIR sensor system as defined in claim 1, further comprising:
a first bandpass filter for filtering the first output signal for removing noise and/or a continuous signal component; and/or
a second bandpass filter for filtering the second output signal for removing noise and/or a continuous signal component.

11. The PIR sensor system as defined in claim 1, wherein the processing unit is configured to determine in which of the detection cells the heat source is positioned at a predetermined time interval by mapping the position of the heat source.

12. The PIR sensor system as defined in claim 1, wherein the processing unit is configured to determine a motion direction of the heat source by determining the position of the heat source at a predetermined time interval by mapping the position of the heat source and/or by monitoring changes in the first and second output signals.

13. A lighting system, comprising:
the PIR sensor system as defined in claim 1; and
a light source configured to be controlled by the PIR sensor system.

14. The PIR sensor system as defined in claim 1, wherein at least a subset of the predetermined amplitudes, of at least one of the first output signal or the second output signal, of the detection cells comprise different, non-zero magnitudes based on a proximity between the detection cells and the first PIR sensor or the second PIR sensor.

15. A PIR sensor system, comprising:
a first PIR sensor associated with a first sensing region, the first PIR sensor comprising a first sensing element configured to sense heat radiation from a first group of zones of the first sensing region and a second sensing element, which is distinct from the first sensing element, configured to sense heat radiation from a second group of zones of the first sensing region, wherein at least one zone of the first group of zones is associated with one of the first and second sensing elements and at least one zone of the second group of zones, adjacent to the at least one zone of the first group of zones, is associated with the other one of the first and second sensing elements;
a second PIR sensor associated with a second sensing region, the second PIR sensor comprising a third sensing element configured to sense heat radiation from a first group of zones of the second sensing region and a fourth sensing element, which is distinct from the third sensing element, configured to sense heat radiation from a second group of zones of the second sensing region, wherein at least one zone of the first group of zones of the second region is associated with one of the third and fourth sensing elements and at least one zone of the second group of zones of the second region, adjacent to the at least one zone of the first group of zones, is associated with the other one of the third and fourth sensing elements;
wherein the first and second sensing regions partially overlap such that an overlapped zone of the first sensing region overlapping a zone of the second sensing region defines a plurality of detection cells and a non-overlapped zone defines another detection cell;

wherein the sensor system is configured to represent each detection cell with a predetermined amplitude and a predetermined sign of a first output signal based on input signals from the first and second sensing elements of the first PIR sensor and with a predetermined amplitude and a predetermined sign of a second output signal based on input signals from the third and fourth sensing elements of the second PIR sensor, each predetermined amplitude determined by a distance from the detection cell to the first and second PIR sensors, and each predetermined sign determined by a wiring between input of the sensing element associated with the zone and a differential electronic component, the PIR sensor system further comprising:

a processing unit configured to associate the amplitude and sign of the first output signal and the amplitude and sign of the second output signal with one of the detection cells to determine a position of a heat source within the first and second sensing regions; and a calibration unit configured to determine a configuration of the first and second sensing regions based on the first and second output signals by analyzing a configuration of the first and second output signals generated in response to a motion of an installer along a predefined pattern.

16. The PIR sensor system as defined in claim 15, wherein the calibration unit is configured to determine one or more of coverage, orientation and spatial overlap of the first and second sensing regions by determining a geometry of an optical means and/or a spatial shift between the first and second PIR sensors.

* * * * *